United States Patent [19]

Okoshi et al.

[11] 4,329,019

[45] May 11, 1982

[54] THREE-DIMENSIONAL IMAGE DISPLAY APPARATUS AND A SCREEN THEREFOR

[75] Inventors: Takanori Okoshi, 7-7, 3-chome, Sengoku, Bunkyo-ku, Tokyo, Japan; Makoto Okoshi, deceased, late of Tokyo, Japan, by Takanori Okoshi, legal representative

[73] Assignee: Takanori Okoshi, Tokyo, Japan

[21] Appl. No.: 112,191

[22] Filed: Jan. 15, 1980

Related U.S. Application Data

[63] Continuation-in-part of Ser. No. 42,614, May 25, 1979, abandoned, which is a continuation of Ser. No. 884,845, Mar. 9, 1978, abandoned, which is a continuation-in-part of Ser. No. 372,001, Jun. 21, 1973, abandoned, which is a continuation of Ser. No. 808,223, Mar. 18, 1969, abandoned.

[30] Foreign Application Priority Data

Mar. 21, 1968 [JP] Japan ................................ 43-18482

[51] Int. Cl.³ ............................................ G03B 21/60
[52] U.S. Cl. .................................... 350/129; 340/383; 350/3.72; 350/103; 350/299; 353/7; 354/112; 362/327
[58] Field of Search ................. 350/125, 129, 55, 299, 350/102, 103, 3.7, 3.72; 354/112; 353/7; 340/383; 362/327, 339

[56] References Cited

U.S. PATENT DOCUMENTS

| | | | |
|---|---|---|---|
| 1,671,086 | 5/1928 | Stimson | 362/327 X |
| 1,743,835 | 1/1930 | Stimson | 362/327 X |
| 1,883,291 | 10/1932 | Ives | 353/7 |
| 2,889,739 | 6/1959 | Moore | 353/7 |
| 3,053,144 | 9/1962 | Harries et al. | 353/7 X |
| 3,479,111 | 11/1969 | Gabor | 350/125 X |
| 3,712,706 | 1/1973 | Stamm | 350/129 X |
| 3,715,154 | 2/1973 | Bestenreiner | 350/129 X |

*Primary Examiner*—Richard A. Wintercorn
*Attorney, Agent, or Firm*—Toren, McGeady and Stanger

[57] ABSTRACT

In the disclosed three-dimensional image display apparatus, a projecting system projects images having parallax information onto a screen. The screen is composed of a plurality of corner reflectors each composed of three intersecting reflecting surfaces, two of which are flat and intersect at right angles to each other in a line perpendicular to a parallax direction of said images and the other one of which is cylindrical with respect to said parallax direction and at right angles to said two surfaces to be placed in optically identical angular relation to said two surfaces. A mask shields the area around the projecting system so that only light reflected transverse to the parallax can be viewed.

6 Claims, 17 Drawing Figures

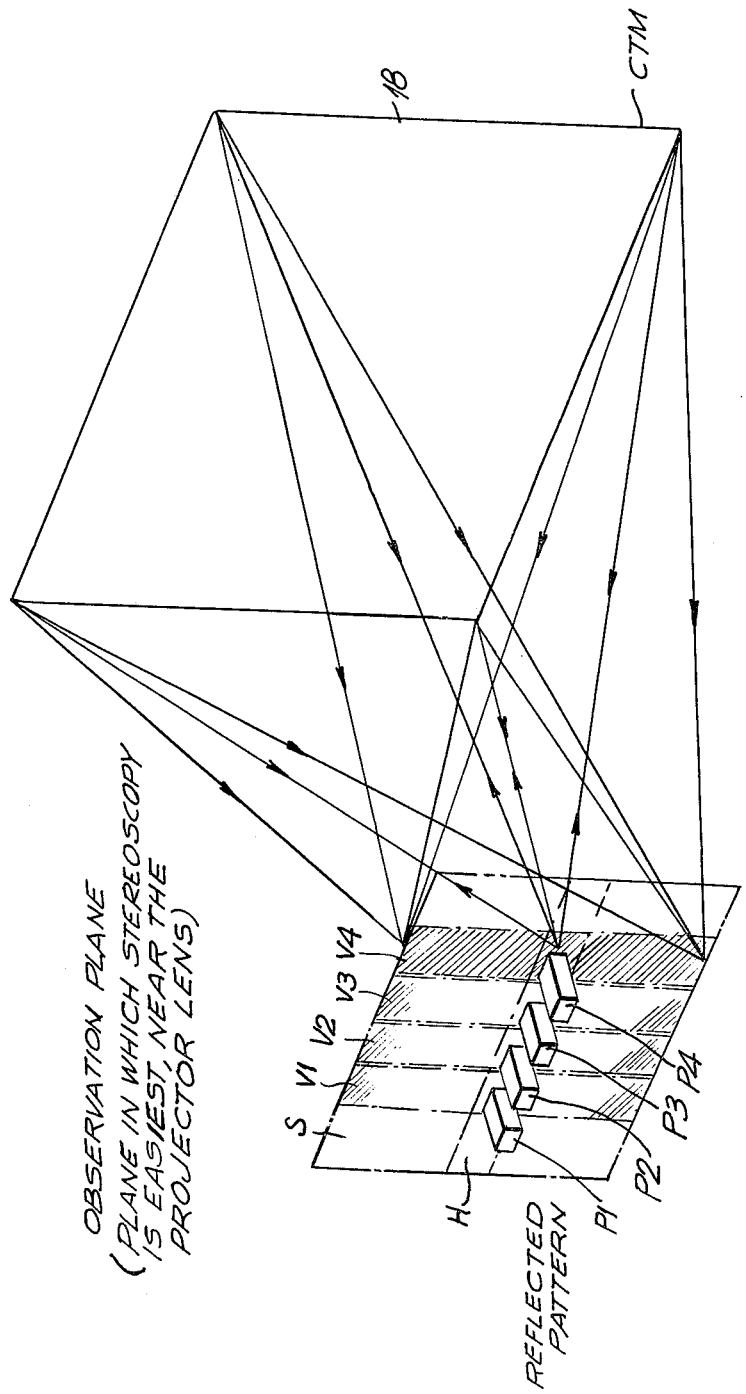

THREE-DIMENSIONAL IMAGE DISPLAY APPARATUS AND A SCREEN THEREFOR

CROSS REFERENCES TO RELATED APPLICATIONS

This application is a continuation-in-part of application, Ser. No. 042,614, filed May 25, 1979, now abandoned which is a continuation of application, Ser. No. 884,845, filed Mar. 9, 1978, now abandoned, which is a continuation-in-part of application, Ser. No. 372,001, filed June 21, 1973, now abandoned, which in turn was a continuation of application, Ser. No. 808,223, filed Mar. 18, 1969 and now abandoned.

BACKGROUND OF THE INVENTION

This invention relates to a three-dimensional image display apparatus and direction-selective reflection screens therefor.

Three-dimensional images can be displayed by projecting a multiplicity of elemental images having parallax information onto a direction-selective reflection screen. One example of a photogram consisting of a multiplicity of independent and non-overlapping elemental images involves a multiplicity of elemental pictures, recorded in respective film frames of the same scene photographed from different angles with a stereoscopic camera, or a plurality of standard cameras coupled to create parallax. Each of the elemental pictures corresponds to an image of a large portion of the scene being photographed as viewed by one of a pair of human eyes positioned at a parallactic distance from the other. In other words, the multiplicity of elemental pictures has parallax information. In most cases, the parallax direction is horizontal. One way of producing a three-dimensional image by projection of the aforementioned elemental pictures is to set up a number of projectors corresponding to the number of the elemental pictures and arranged in the same way as the camera objective lenses were arranged when the pictures were taken, and direct the projector at the same direction-selective reflection screen so it can be observed at a predetermined position relative to the projectors. Of course, it is possible to replace the number of projectors with a stereoscopic projector having a number of projection objectives.

In this specification, the direction between photograhic objectives during photography of the elemental pictures or the direction between projecting objectives during projection of the above-mentioned elemental pictures is known as the parallax direction. Specifically, the direction connecting the eyes of a photographer or the eyes of an observer is the parallax direction. In most cases, when the line connecting the photographer's eyes or the observer's eyes is horinzontal, the parallax direction (or parallactic direction) is usually horizontal.

Various types of direction-selective reflection screens are known. For example, that disclosed in U.S. Pat. No. 1,883,291. This screen is constructed of a network of reflector elements, each of which consists of two mirrors arranged to intersect at right angles to each other in a line perpendicular to the parallax direction of the image to be projected thereon. A disadvantage of such a screen in projecting the elemental images is that as the axis of the light beam projected departs farther and farther away from the axis normal to the planes parallel to the intersection of the two mirrors, the incident beam is reflected further upward or downward. Hence, a large proportion of the reflected beam will not reach the eyes of an observer located at a position corresponding to that of the projector. As a result, the brightness of the three-dimensional image particularly at the upper and lower portions thereof is unacceptably reduced. To avoid this phenomenon, it is necessary that the entire surface of the screen be curved so as to be cylindrical with respect to the line parallel to the parallax direction. Such a deformation of the screen, however, will result in an appreciable distortion of the displayed image.

There is another way to construct the screen having improved reflection selectivity characteristics without imparting any curvature to the entire surface of the screen. This is accomplished with a network of so-called cubic corner type reflectors, each of which consists of three flat reflecting surfaces arranged to intersect at a common point with the reflecting surfaces at right angles to each other. A light beam incident upon such a screen is reflected back along the incident beam accurately upon the source of the light beam. Therefore, a three-dimensional image, though displayed on the screen by projecting the elemental images in the photogram having parallax information, cannot be observed unless the observer is located exactly at the projector. With a half-mirror positioned in the path of the projection light beam between the projector and the screen, the three-dimensional image is made observable to the observer only when he is located at the position symmetrical to the position of the projector with respect to the half-mirror plane; that is, at the position corresponding optically to the position of the projector. It follows that the three-dimensional image display system employing the cubic corner type reflector screen is characterized by an extremely narrow range of optimum observer positions. In order for the display system to permit some freedom of motion of the head in the vertical direction from the projector in observing the display, it is necessary to accommodate a number of additional projectors superimposed on the existing projector in a plane perpendicular to the parallax direction. This additional projector arrangement defeats the purpose of minimizing the complexity of the three-dimensional image display apparatus. Further, the utilization of the half-mirror arranged between the projector and the screen causes a considerable loss of image-forming light in its reflection therefrom as well as in its transmission therethrough to the observer.

Cubic corner reflector screens are disclosed in U.S. Pat. Nos. 1,671,086 and 1,743,835. These screens are used for purposes of road signs, etc. and have one or more surfaces on each reflector deformed to spread light in all directions. If such screens were used with adjacent projectors projecting complementary parallax images, the light on the screen would be spread in all directions simultaneously. Thus, the light from one projector projecting one parallax image becomes confused with the light from another projector projecting another parallax image over the entire screen. Thus, a three-dimensional image would not be perceived.

SUMMARY OF THE INVENTION

An object of the present invention is to alleviate these deficiencies.

Another object of the present invention is to provide a three-dimensional image display apparatus in which a direction-selective reflection screen receives a multiplicity of images having parallax information from the projecting means onto the screen which produces a three-dimensional image and permits freedom of motion of the head along a plane perpendicular to the parallax direction in an upward or downward direction from the projecting means in observing the three-dimensional display.

Another object of the present invention is to provide a novel direction-selective reflection screen which reflects and diffracts a beam of light rays incident upon the screen from the projecting means in planes perpendicular to the parallax direction in directions either continuously or discretely deviating from the direction opposite to that in which said beam is projected, while still permitting the information related to the parallax direction to be retained in the reflected beam of light rays without any disturbance in the horizontal direction.

Another object is to minimize stray or undesirable reflections.

According to a feature of the present invention, a direction-selective reflection screen comprises a plurality of reflectors, each of which consists of three reflecting surfaces arranged to intersect at a common point as in a cubic corner type reflector. A reflector composed of three reflectors at right angles to each other, i.e., a reflector corresponding in shape to the interior corner of a cube (a cubic corner type reflector) may be said to be retroreflective. That is, it reflects light substantially in the direction from whence it came. A screen uniformly composed of such corner reflectors also may be said to be retroreflective. Light which strikes such a screen is reflected back to its source. In the present feature, two of the reflecting surfaces are flat and intersect at right angles to each other. The third reflecting surface is cylindrical but is in optically identical angular relation to the first and second reflecting surfaces. The reflectors of the construction described above are arranged in the display surface of the screen so that the line at which the first and second reflecting surfaces intersect is perpendicular to the parallax direction of the image to be displayed thereon. In this arrangement of reflectors, therefore, the third, i.e., cylindrical, reflecting surfaces are curved around axes oriented parallel to the parallax direction irrespective of whether they are concave or convex. With a screen formed from reflectors of which the third reflecting surfaces are cylindrical, beams of light rays carrying images having parallax information incident thereon from the projecting means are diffusely relected in planes perpendicular to the parallax direction in directions continuously deviating from the direction opposite to that in which the beams are projected.

It is to be understood that each of the above-mentioned screens provide reflected beams retaining the parallax information carried on the elemental images without any disturbance in the parallax direction. Upon projection of a multiplicity of elemental images having parallax information from projecting means onto the screen of the invention, a three-dimensional image can be produced on the screen which is observable to a pair of human eyes located upwardly or downwardly in a range of distances from the projecting means.

According to another feature of the invention, light shielding means extend substantially parallel to the recorded images and have a longitudinal dimension parallel to the parallax which embraces the projecting means and a dimension transverse to the parallax to remove a portion of the light from the screen, and define one or more openings for passage of light from the projecting means. The light shielding means remove extraneous light diffused in the parallax direction. This feature is based upon the recognition that some extraneous diffused light is concentrated along the parallax direction even with the aforementioned screen and that this diffusion is limited in extent to a band transverse to the parallax direction.

According to another feature of the invention, the projecting means includes a plurality of film projectors.

According to still another feature, the projecting means includes a holographic reconstructing system.

These and other features of the invention are pointed out in the claims. Other objects and advantages of the invention will become evident from the following detailed description when read in light of the accompanying drawings.

BRIEF DESCRIPTION OF THE DRAWINGS

FIGS. 13 and 14 are perspective and elevational views of systems embodying features of the present invention.

DESCRIPTION OF PREFERRED EMBODIMENTS

An apparatus for producing three-dimensional images by projecting a multiplicity of images having parallax information requires either a reflection type projection screen having the property of directing a light beam incident thereon from projecting means toward an observer located on the side on which the projecting means is present in a definite direction relative to that in which the incident beam is projected, or a transmission type projection screen having the property of directing a light beam incident thereon from projecting means toward an observer located on the side opposite to the projecting means in a definite direction optically equivalent to that in which the incident beam is projected, or a projection screen having at least the property that the above-mentioned parallax information carried on the incident beam is retained in the exit beams. A screen having such a property is herein referred to as "direction-selective screen".

Figure 1:
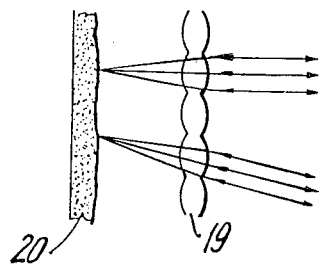
FIG. 1 is a fragmentary sectional view of a direction-selective reflection screen wherein a fly's eye lenslet network, or lenticular sheet is used.

FIG. 1 shows one type of direction-selective reflection screen which comprises a fly's eye lenslet network 19 or a lenticular network sheet 19 and a diffusing reflection plate 20. The screen provided with the fly's eye lenslet network has the property of reflecting light beams incident thereon almost along the incident beam back toward the source of light as shown in FIG. 1. By employment of the so-called "anamorphic" lens scheme in the screen, it is made possible to impart into the screen a further property of diffusing the reflected beams in planes parallel to a specified direction; for example, in the vertical planes, while permitting the incident beam to be reflected without any diffusion in planes perpendicular thereto, i.e., in the horizontal planes. In this case, each of the fly's eye lenslets is curved from the spherical configuration in such a manner that the incident light beam is focused on the diffusing surface in the horizontal direction, while it is somewhat defocused thereon in the vertical direction. The screen provided with a lenticular sheet 19 has the further property of diffusing the reflected beam in planes parallel to one specified direction through an angle which may be varied to a large degree.

Figure 2:
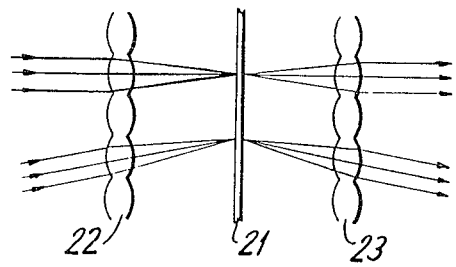
FIG. 2 is a fragmentary sectional view of a direction-selective transmission screen wherein two fly's eye lenslet networks, or two lenticular sheets are used.

As shown in FIG. 2, a direction-selective rear screen is constructed comprising a pair of fly's eye lenslet networks or lenticular sheets 22 and 23, and a transmission-type diffusing plate 21 intervening therebetween. The optical phenomena of the direction-selective rear screen are identical to those of the screen of FIG. 1 except that the phenomena are observed on the opposite side to that of FIG. 1.

Figure 3:
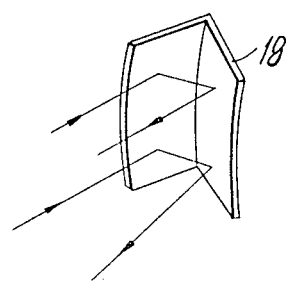
FIG. 3 is a perspective view of an arrangement of two curved mirrors at right angles to each other.

FIG. 3 shows the structure of a two-mirror reflector improved over the two-mirror reflector previously mentioned. The improvement resides in that the two reflecting surfaces at right angles to each other are curved so as to be cylindrical with respect to the intersection thereof so as to diffuse the reflected beam of light rays in planes perpendicular to the horizontal direction.

Figure 4:
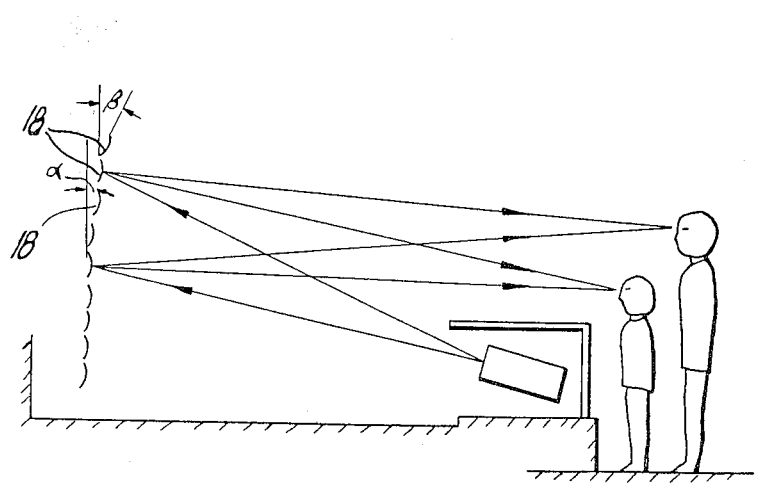
FIG. 4 is a schematic side view of a three-dimensional image display apparatus provided with a screen comprising a plurality of two mirror-type reflectors of FIG. 3.

FIG. 4 illustrates a three-dimensional image display apparatus provided with a screen comprising a plurality of two mirror reflectors 18 of the construction shown in FIG. 3. As previously mentioned, the entire surface of the screen is curved with a predetermined curvature so that some distortion of the displayed image inevitably results. Although this screen is not free of the conventional drawback, it requires no half-mirror in observing the display which would have been required in the apparatus provided with the otherwise designed two-mirror type reflector screen, because the reflected beams are diffused in planes perpendicular to the parallax direction.

Figure 5:
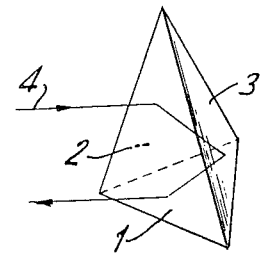
FIG. 5 is a perspective view of a cubic corner type reflector.

FIG. 5 shows a cubic corner type reflector consisting of three reflecting surfaces 1, 2 and 3 arranged to intersect at a common point with reflecting surfaces at right angles to each other. A beam 4 incident on such a reflector is reflected three times from surface-to-surface and back along the incident beams. In other words, the cubic corner type reflector has the property of reflecting an incident beam of light rays parallel to the path of the incident beams but in the direction opposite to that in which the incident beam enters the reflector. That is, it is retroreflective.

Figure 6:
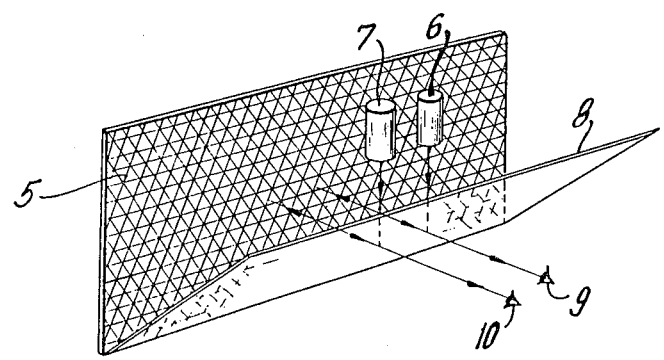
FIGS. 6 and 7 are schematic perspective views illustrating a method of displaying a three-dimensional image on a screen constructed in the form of a network of cubic corner type reflectors of FIG. 5.

FIG. 6 shows an arrangement of the basic parts of a three-dimensional image display apparatus employing a screen 5 comprising a plurality of cubic corner type reflectors of FIG. 5 arranged in contiguous relationship. A pair of projectors 6 and 7 which project elemental images of the same object taken from different positions spaced at a parallactic distance (i.e., a stereoscopic couple) are arranged along the parallax direction of the stereoscopic couple and above a beam splitting mirror, or half-mirror 8 which reflects the elemental image-bearing beams toward the screen 5. The screen 5 acts as a plane reflecting mirror to reflect these two beams back through the half-mirror 8 to define two spaced exit pupils where an observer may place his eyes 9 and 10 to observe the right and left view images of a stereoscopic couple with his right and left eyes 9 and 10 respectively. A three-dimensional sensation is thereby perceived.

The right and left eyes 9 and 10 are in positions symmetrical to the positions of the exit pupils of the projectors 6 and 7 with respect to the half-mirror 8. Therefore, without the help of the half-mirror, the two elemental image-bearing beams will be projected directly from the projectors 6 and 7 to the screen and back. Hence, the observer would, without the half-mirror, have to place his eyes at the projectors, or else, the three-dimensional image displayed on the screen cannot be viewed by him. For the convenience of some motion of his head as he moves along the projector arrangement line or the parallax direction, it is desirable to employ and arrange many projectors along the parallax direction as shown in FIG. 7, because the optimum observation positions are limited to positions symmetrical to the positions of the projectors with respect to the plane of the half-mirror.

Aside from its use in projecting a multiplicity of elemental images having only one parallax, the apparatus provided with a large number of projectors 11, 12, 13 and 14 may be utilized to project a corresponding multiplicity of elemental images having complex parallax information or a group of elemental pictures produced so as to have a series of different parallaxes.

Figure 7:
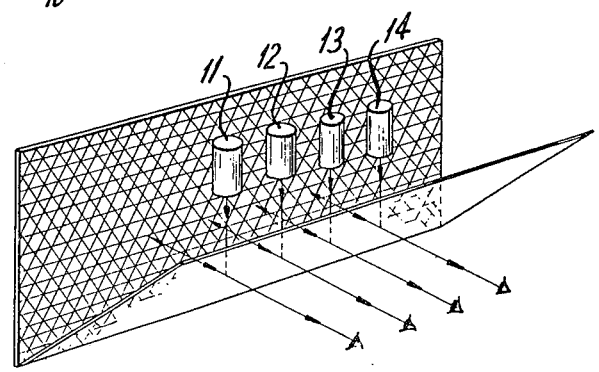

In FIGS. 6 and 7, the apparatus is illustrated using separate projectors. Of course, these may be replaced by one stereoscopic projector having a corresponding number of projection apertures arranged on a common line in predetermined spaced relationship. The photogram consisting of a multiplicity of elemental images to be projected is not confined to ones recorded on the photographic film by the use of stereoscopic cameras, but may be others, such as written patterns and holograms provided that when coupled with each other, they create parallax. The performance of the direction-selective screen in making the three-dimensional image observable is to retain the parallax information in the three-dimensional image projected onto the screen from the projecting means during the display operation without causing any disturbance thereof. Therefore, whether the three-dimensional image is to be produced from the elemental images produced by a stereoscopic camera or from a hologram is not essential for the direction-selective screen. For convenience, embodiments of the invention described hereinbelow are directed to applications wherein a multiplicity of elemental images produced by a steroscopic camera is projected from a corresponding number of separate projectors.

Figure 8:
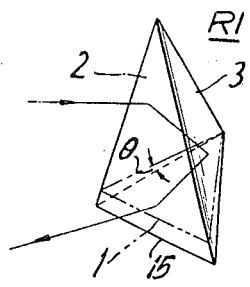
FIG. 8 is a perspective view of one example of a reflector for three-dimensional viewing wherein one of the three reflecting surfaces is tilted from optically true right angle relation.

FIG. 8 illustrates an example of a reflector R1 constituting an elemental part of the screen which is suitable for some three-dimensional viewing. The reflector R1 consists of three flat reflecting surfaces 2, 3 and 15, two of which, namely, surfaces 2 and 3 are arranged to intersect at right angles to each other. The other reflecting surface 15 is tilted from an optically right angular relation indicated by a non-tilted plane 1, but is placed in optically identical angular relation to the reflecting surfaces 2 and 3. The reflecting surfaces 2 and 3 are identical to each other in the geometrical sense. The reflecting surface 15 is illustrated as tilted downwardly from the plane 1 as viewed in FIG. 8, or outwardly of the surfaces 2 and 3. A beam incident upon the reflector is reflected from surface-to-surface in one of six different orders. Of these, the four orders, namely, 2-3-15; 3-2-15; 15-2-3; and 15-3-2 permit the reflected beam to emanate from the reflector only in planes parallel to the direction in which the surface 15 is tilted in directions deviating from the direction opposite to that in which the incident beam enters the reflector. The magnitude of deviation depends upon the angle through which the surface 15 is tilted from the plane 1. The other two orders of reflection, namely, 2-15-3 and 3-15-2 permit the reflected beam to emanate only in planes perpendicular to the direction in which the surface 15 is titled in directions deviating from the direction opposite to that in which the incident beam enters the reflector. If the reflector is oriented in the screen so that the direction in which the surface 15 is tilted coincides with the vertical direction and the surface 15 coincides with one generated by a straight line moving in such a way that it is always parallel to the horizontal direction, the horizontal component of the information of the image with the incident beam is retained in the reflected beam as far as the former four orders of reflection are concerned.

Figure 10:
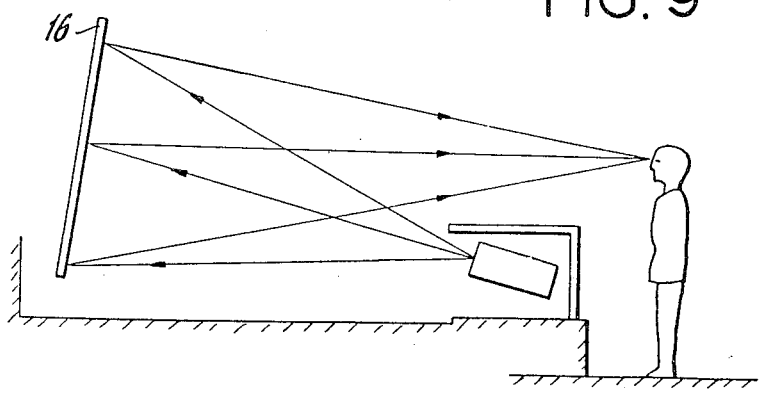
FIG. 10 is a schematic side view of a three-dimensional image display apparatus provided with a screen of a network of reflectors of FIGS. 8.

FIG. 10 shows an arrangement of the basic parts of a three-dimensional image display apparatus employing a screen 16 constructed in the form of a network of reflectors R1 whose details are shown in FIG. 8. The reflectors are arranged in the screen in closely fitted relationship as shown in FIGS. 6 and 7. The many reflectors of the network are preferably of identical dimensions and as small as possible for the improvement of the resolving power of the three-dimensional images. Preferably, the individual reflectors are of identical angles of deviation for the improvement of the image quality. A plurality of projectors which project the corresponding plurality of elemental images are arranged along the parallax direction which coincides with the horizontal direction as viewed in FIG. 10. The reflectors are arranged in the screen 16 with respect to the projector arrangement line so that the intersection of the two flat reflecting surfaces 2 and 3 of each reflector is perpendicular to the parallax direction or the projector arrangement line, and each of the tilted surfaces 15 coincides with a plane parallel to the parallax direction. In other words, each of the reflecting surfaces 15 are tilted with respect to said parallax direction from the plane 1 at right angles to the reflecting surfaces 2 and 3. The screen 16 may be composed of reflectors having inwardly tilted surfaces 15 and reflectors having outwardly tilted surfaces 15 in an optional proportion provided that the absolute angles through which the surfaces 15 are tilted outwardly or inwardly are preferably identical to one another as previously mentioned.

A screen, such as 16, makes it possible for a large proportion of the beams incident upon the screen from the projectors to be reflected in planes perpendicular to the parallax direction and in directions deviating from the direction opposite to that in which the incident beams are projected, and to reach observation fields above and under the projectors as viewed in FIG. 10. There are sometimes appreciable gaps between the successive observation fields in the vertical direction, but these gaps can be lessened by controlling the sizes of the apertures of the projection lens systems of the projectors as the reflected beams are distributed in a certain range in the vertical direction.

As mentioned, the reflected beams are directed in planes perpendicular to the parallax direction while retaining the parallax information. Therefore, the three-dimensional image is observable to a pair of human eyes located at distances from the projectors in the direction perpendicular to the parallax direction. Although a small proportion of the beams incident upon the screen from the projectors is reflected in planes parallel to the parallax direction, and make no contribution to the three-dimensional image display, they have little adverse effect in observing the display because they are mainly diffused and reflected back toward the projectors.

In constructing the screen to give it the property of reflecting the incident beams in planes perpendicular to the parallax direction so as to extend the range of observation positions in the vertical direction from the projectors while retaining the parallax information in the reflected beams, it is important for each of the reflectors of the screen that the intersection of the two flat reflecting surfaces 2 and 3 at right angles to each other be accurately oriented so as to be perpendicular to the parallax direction of the multiplicity of elemental images to be projected. It is also important that the reflecting surface 15 be accurately oriented so as to be tilted with respect to the parallax direction and so that the tilted surface 15 coincides with one generated by a straight line always parallel to the parallax direction. If the surface 15 is tilted regardless of the parallax direction and/or if the intersection of the surfaces 2 and 3 is permitted to assume an optional attitude regardless of the parallax direction, the reflected beams are certainly not concentrated on the projectors only. Rather, they are dispersed in all directions, resulting in disturbance of the parallax information of the multiplicity of elemental images to not effect three-dimensional image display.

Figure 9:
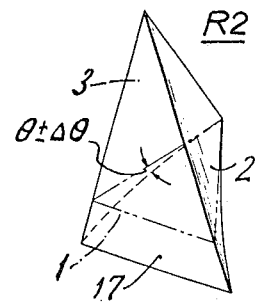
FIGS. 9 and 9A are perspective views of other examples of a reflector according to the invention wherein one of the three reflecting surfaces is curved from optically true right angle relation.
Figure 9A:
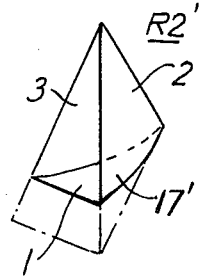

FIGS. 9 and 9A show one example of a reflector 12 constituting an elemental part of a screen 18 in a system embodying features of the present invention. The reflector R2 is composed of three reflecting surfaces 2, 3 and 17, two of which are flat surfaces 2 and 3 and are arranged to intersect at right angles to each other. The other reflecting surface 17 is curved to progressively deviate from optically right angular relation indicated by plane 1, and is placed in optically identical angular relation to the reflecting surfaces 2 and 3. The reflecting surfaces 2 and 3 are identical to each other in the geometric sense. The reflecting surface 17 is illustrated as convex toward the other two flat reflecting surfaces 2 and 3. But the surface 17 may be curved so as to be concave toward the surfaces 2 and 3. A beam incident upon the reflector is reflected from surface-to-surface in one of six different orders. Of these, the four orders, namely, 2-3-17; 3-2-17; 17-2-3; and 17-3-2 permit the reflected beam to emanate from the reflector only in planes parallel to the normal of the cylindrical surface 17 in directions continuously deviating from the direction opposite to that in which the incident beam enters the reflector. If the reflector is oriented in a screen so that the cylindrical surface 17 coincides with one generated by a straight line parallel to the horizontal direction, the reflected beams are diffused only in vertical planes, and, therefore, the horizontal component of the information of the image with the incident beams is retained in the reflected beam as far as the above-mentioned four orders of reflection are concerned. After an incident beam is reflected in one of the two orders, namely, 2-17-3; and 3-17-2, the reflected beam emanates only in planes parallel to the cylindrical surface 17 in directions continuously deviating from the direction opposite to that in which the incident beam enters the reflector. This horizontal reflected beam does not retain the horizontal component of the information of the image with the incident beam. Rather, the horizontal component becomes disturbed.

FIG. 9A shows a reflector R2', another form of the reflector R2 in which the surface 17' is concave relative to surfaces 2 and 3. This reflector R2' exhibits the same vertically retroreflective characteristics as the reflector R2.

Figure 11:
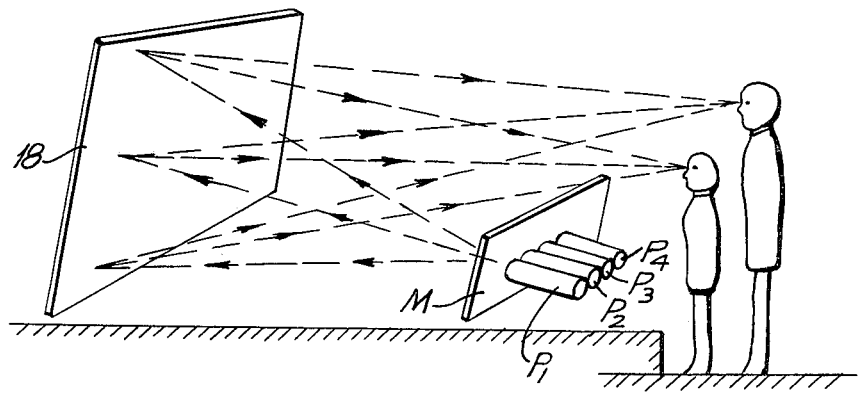
FIG. 11 is a schematic side view of a three-dimensional image display apparatus embodying features of the invention.

FIG. 11 shows reflectors R2 or R2' in an arrangement embodying the invention. Here, a screen 18 is formed from a plurality of the reflectors R2 of FIG. 9. The screen 18 corresponds to the screen 16 except for having reflectors R2 instead of R1. The many reflectors R2 of screen 18 are preferably of identical dimensions and are as small as possible for the improvement of the resolving power of the three-dimensional images. Preferably, the individual cylindrical reflecting surface 17 of all of the reflectors are of identical radii of curvature for the purpose of improving the image quality. A plurality of projectors P1 to P4 which project the corresponding plurality of elemental images are arranged along the parallax direction. The reflectors R2 are arranged in the screen 18 with respect to the projector arrangement line so that the intersection of the two flat reflecting surfaces 2 and 3 of each reflector is perpendicular to the parallax direction or the projector arrangement line, and each of the cylindrical surfaces has its axis parallel to the parallax direction. In other words, the surface 17 is curved so as to be cylindrical with respect to the parallax direction. The screen 18 may be composed of reflectors R2 having cylindrical reflecting surfaces 17 convex toward the other two flat reflecting surfaces and reflectors R2' having cylindrical reflecting surfaces 17' concave toward the other two flat reflecting surfaces in an optional proportion. Preferably the radii of curvature of the cylindrical surfaces 17 are identical to one another as mentioned.

With the screen 18 having reflectors R2 and/or R2', a large proportion of the beams incident upon the screen from the projectors is reflected and diffused in planes perpendicular to the parallax direction in directions continuously deviating from the direction opposite to that in which the incident beams are projected. The reflected beams retain the parallax information as mentioned. Therefore, a three-dimensional image is observable to a pair of human eyes located at distances from the projectors in the direction perpendicular to the parallax direction. With the screen 18 formed from a plurality of reflectors R2 and/or R2' having cylindrical reflecting surfaces 17 and/or 17', the reflected beams are diffused in planes perpendicular to the parallax direction more widely and uniformly than with the screen 16 formed from a plurality of reflectors having flat tilted reflecting surfaces shown in FIG. 8. Hence, the three-dimensional image display apparatus provided with the screen 18 constructed in accordance with this embodiment of the invention permits a certain continuous range of motion of the head in the direction perpendicular to the parallax direction upwardly or downwardly from the projectors while observing a good quality three-dimensional image. In constructing the screen 18 from the aforementioned reflectors R2 and R2' of FIG. 9, it is important for each of the reflectors that the intersection of the two flat reflecting surfaces 2 and 3 at right angles to each other be accurately oriented so as to be perpendicular to the parallax direction of the multiplicity of elemental images to be projected, and that the axis of the cylindrical surface 17 or 17' be parallel to the parallax direction. If the surface 17 or 17' has its axis parallel in a direction other than the parallax direction, and/or if the intersection of the surfaces 2 and 3 is permitted to assume an optional attitude regardless of the parallax direction, the reflected beams are certainly not concentrated only on the projectors, they are dispersed in all directions, resulting in disturbance of the parallax information of the multiplicity of elemental images to effect no three-dimensional image display.

In the screen 18 of FIG. 11, which may be called a curved triple mirror (or CTM) screen, the quality of the displayed three-dimensional image is substantially susceptible to deviations of reflector parameters from the specific values and errors, or orientation and arrangement of the reflectors in the screen with respect to the parallax direction in assembling a complete screen from the reflector elements. An increase of deviations and errors causes deterioration in the direction-selectivity of the screen causing a larger disturbance of the parallax information of the multiplicity of elemental images in the original photogram.

The screen 18 reflects a portion of the incident beam in planes other than those perpendicular to the parallax direction as mentioned. A plate M substantially reduces or virtually eliminates any adverse effect which the reflection of an incident beam in planes other than those perpendicular to the parallax direction, i.e., the direction about which the surfaces 17 or 17' are curved, may produce on the three-dimensional display. The reflection in directions other than transverse to the parallax direction produces a zone in which three-dimensional images cannot be observed. This will become evident from an examination of FIGS. 12 and 13.

Figure 12:
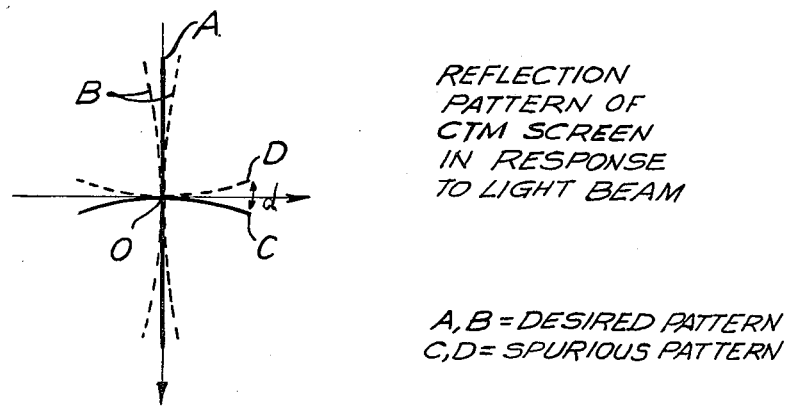
FIG. 12 illustrates the reflection patterns of the screen in FIGS. 9 and 9A.

FIG. 12 illustrates the reflection patterns formed when a light beam is projected onto the screen 18 at right angles to the plane of the screen 18. In FIG. 12, the corner reflectors are arranged so that the axes about which the surfaces 17 or 17' curve are parallel to the expected parallax, i.e., horizontal in this case. The reflection patterns A, B, C, and D are all formed within the plane at right angles to the axis O of light projected onto the screen 18. The patterns A and B are vertical and transverse to the parallactic axis. With a number of parallactically-spaced projectors, the patterns A and B are the desired patterns for producing the three-dimensional perception by an observer. The patterns C and D are substantially parallel to the parallactic axis, i.e., horizontal, and when formed by a number of projectors of two-dimensional parallactic images, do not cause perception of three-dimensional images by a viewer. The patterns C and D form spuriously, and hence, undesirable images.

As shown in FIG. 13, when two-dimensional picture images of different parallaxes for three-dimensional observation are projected on the screen 18 by the plurality of projectors P1, P2, P3, and P4, the light projected by the projector P1 and reflected by the screen 18 is expanded vertically on the observation plane S, (i.e., the three-dimensional picture image position at the projector plane, preferably at the projector lens) to provide an image observation zone VI. It is also expanded in the lateral direction to provide a horizontal zone H. The projectors P2, P3, and P4 form vertical zones V2, V3, and V4, while simultaneously forming a horizontal zone H. In this horizontal zone H, where the light is expanded laterally, the images projected by all the projectors are observed simultaneously. Thus, if the left eye is placed in the zone in which V2 and H overlap and the right eye in the zone in which V3 and H overlap, the left eye will observe the images from P2 and P4 in addition to the image from P3. Thus, in the zone H, it is not possible to observe good three-dimensionality.

The present invention eliminates the light which expands in the lateral or horizontal direction by providing a light shielding plate M in the zone in which the light expands in the lateral or horizontal direction. More specifically, as shown in FIG. 14, the light shielding plate M having openings A1, A2, A3, and A4, through which the projected light passes from lenses L1, L2, L3, and L4, is arranged on the three-dimensional picture image plane so as to eliminate the laterally expanding light from the screen 18.

Figure 14:
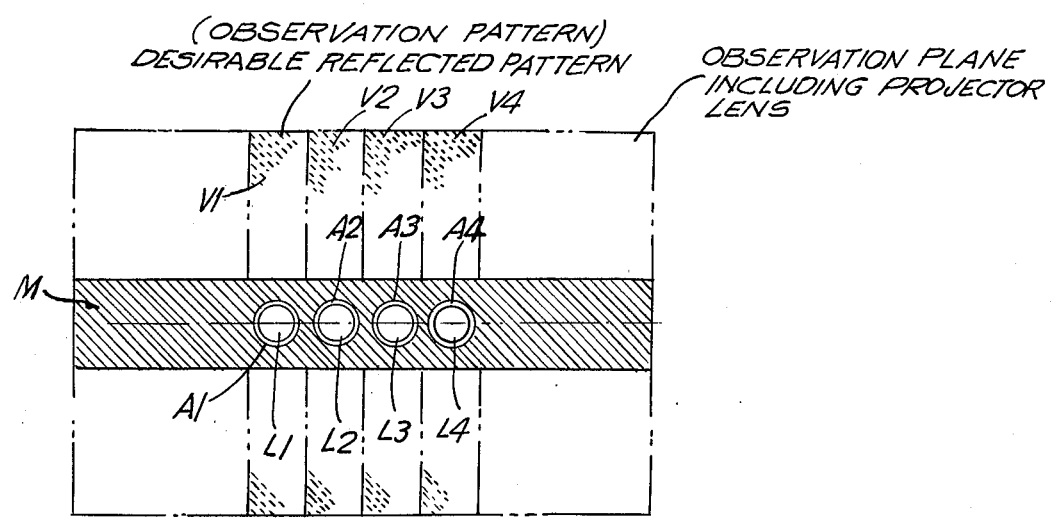

In FIG. 14, the light shielding plate M is in the form of a narrow plate extending in the direction of the arrangement P1 to P4, namely, in the direction of the parallax. The extent perpendicular to the parallax direction, namely, the vertical width of the plate for horizontal parallax is great enough to cover the maximum spurious expansion d in FIG. 12 in the parallactically transverse direction (vertical for horizontal parallax) of the paralactically expanding (horizontally expanding for a horizontal parallax) light. The width in the direction transverse to the parallax, of the light shielding plate M, must be at least d/2 above the optical axis of the nearest projector lens, namely from the center of the projected light along the length transverse to the parallax of the observable zones V1 to V4. If the eyes are always placed above the projectors, the portion below the projector axis may not be needed at all. According to another embodiment, the plate M may extend much further down.

The length of the plate M in the direction along the parallax must extend at least from the extreme end of the zone V1 and the opposite extreme end of the zone V4. The plate M effectively removes the light expanding in the direction of the parallax and limits the zones V1 to V4 to areas in which proper three-dimensional images may be observed.

Preferably, the plate M is made of highly absorbing material, e.g., coated with light absorbing paint or printed with fibers.

Figure 15:
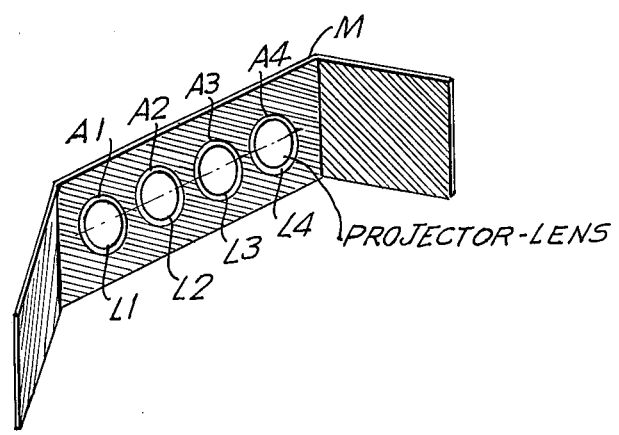
FIG. 15 is a perspective view of a light shield for use with FIGS. 13 and 14, and embodying features of the invention.

FIG. 15 illustrates another light shielding plate M embodying features of the invention. Here, the end portions are turned toward the screen.

The invention is not limited to exhibiting three-dimensional displays from spaced two-dimensional images. Rather, it includes three-dimensional viewing of a three-dimensional record, such as a hologram by means of the screen 18. This is accomplished by illuminating a hologram from behind with a reconstructing beam directed toward the screen 18. The screen 18 then retroreflects the light and expands it.

Figure 16:
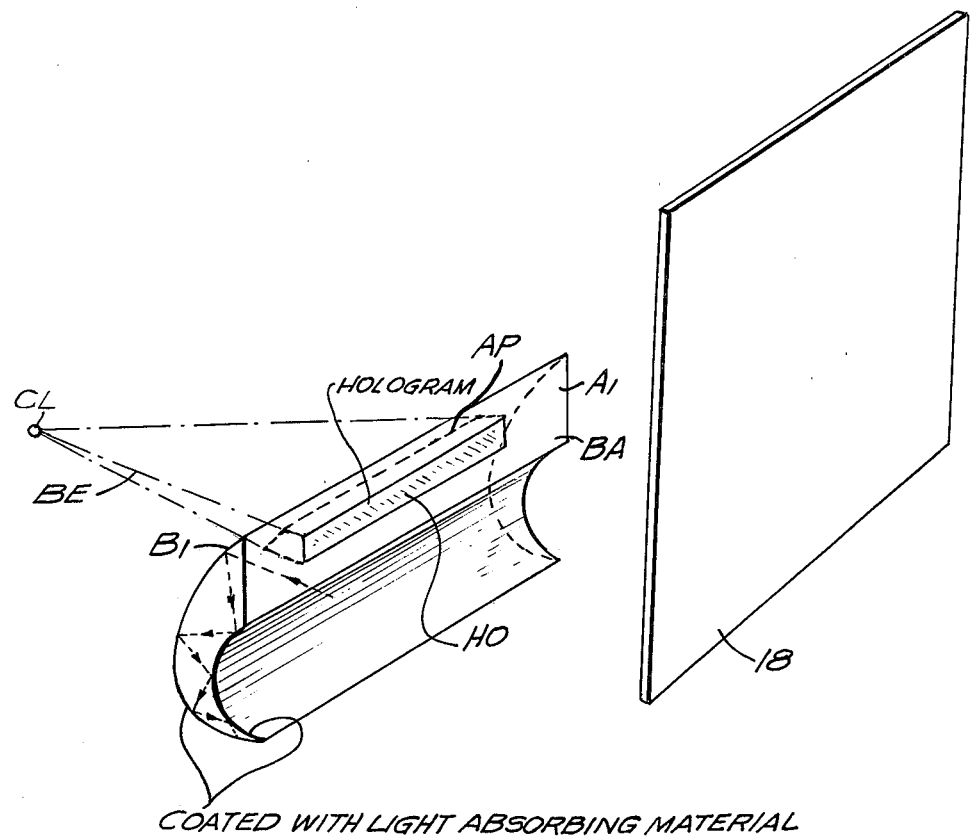
FIG. 16 is a perspective view of still another embodiment of the invention.

FIG. 16 illustrates another system embodying features of the invention and using a light shielding plate. Here, a hologram HO placed in an aperture AP of a horn shaped shield BA is illuminated by a reconstructing beam BE from a coherent light source CL. The light from the hologram produces a reconstructed image on the screen 18 which produces a vertically expanded retroreflective image and a spurious horizontal pattern near the hologram HO. It is here as well as elsewhere assumed that the parallactic direction is horizontal although this need not be the case. The light expanded in the parallactic direction from the reconstructed image passes through the aperture A1 into the horn body where it decays.

According to an embodiment, the horn screen of FIG. 16 is used with a plurality of projectors.

While embodiments of the invention have been described in detail, it will be evident to those skilled in the art that the invention may be embodied otherwise without departing from its spirit and scope.

What is claimed is:

1. A device for producing a three-dimensional picture image, comprising a reflection-type three-dimensional image display screen having plural reflectors arranged to form an image display surface, each reflector including three reflecting faces arranged to intersect at a common point, two of said faces being flat and intersecting at right angles in a line perpendicular to the parallax direction, the other face of each reflector being parallel to the parallax direction and being cylindrical with respect to an axis parallel to said parallax direction, the curvatures of all the cylindrical reflecting faces being equal in absolute value to one another, means for projecting the three-dimensional image recorded on a recording body; a light-shielding arrangement in the plane of the recording body and having an aperture through which light projected from the projecting means passes, said arrangement having a size in a direction perpendicular to the parallax direction large enough to remove light expanding from the screen in the parallax direction.

2. A device according to claim 1, in which the recording body is composed of a plurality of two-dimensional picture images and the projecting means is composed of a plurality of projectors.

3. A device according to claim 2, wherein the plurality of picture images are projected through the aperture of the light shielding arrangement.

4. A device according to claim 1, wherein the recording body is a hologram and the projecting means is a hologram reconstructor including a light source.

5. A device according to claim 4, wherein the hologram is located in the aperture of the light shielding arrangement.

6. An apparatus for three-dimensional image display for an observer's eyes, comprising:
projecting means for projecting a three-dimensional image of an object,
a reflecting type screen having an image display surface, which optically faces said projecting means and an observer's eyes located at a substantial distance from said projecting means in a direction perpendicular to a direction along which the observer's eyes are arranged and defining a parallax direction, and comprising a plurality of reflectors which are formed and arranged in said image display surface so that each reflector consists of three reflecting faces arranged to intersect at right angles to each other in a line perpendicular to said parallax direction, and the other one of which is parallel to said parallax direction and is cylindrical with respect to an axis parallel to said parallax direction, the curvatures of all the cylindrical reflecting faces being made equal in absolute value to one another, so that light rays incident upon the image display surface from the projecting means is reflected therefrom to the observer's eyes to permit said three-dimensional image to be observable.

* * * * *